United States Patent
Kuo et al.

(10) Patent No.: US 7,427,951 B2
(45) Date of Patent: Sep. 23, 2008

(54) METHOD FOR UPDATING EPHEMERIS DATA OF GLOBAL POSITIONING SYSTEM

(75) Inventors: Ming-Jen Kuo, Taipei (TW); Ko-Yi Yao, Taoyuan County (TW)

(73) Assignee: Mitac International Corp., Taoyuan (TW)

( * ) Notice: Subject to any disclaimer, the term of this patent is extended or adjusted under 35 U.S.C. 154(b) by 72 days.

(21) Appl. No.: 11/309,733

(22) Filed: Sep. 19, 2006

(65) Prior Publication Data

US 2007/0159391 A1 Jul. 12, 2007

(30) Foreign Application Priority Data

Sep. 19, 2005 (TW) .............................. 94132256 A

(51) Int. Cl.
G01S 1/02 (2006.01)
(52) U.S. Cl. ................................ 342/357.15
(58) Field of Classification Search ............ 342/357.06, 342/357.12, 357.13, 357.15; 701/207, 213, 701/215
See application file for complete search history.

(56) References Cited

U.S. PATENT DOCUMENTS

2006/0181452 A1* 8/2006 King et al. ............. 342/357.02
2006/0250304 A1* 11/2006 Mo et al. ............... 342/357.15
2007/0247355 A1* 10/2007 King et al. ............. 342/357.06

* cited by examiner

*Primary Examiner*—Dao L Phan
(74) *Attorney, Agent, or Firm*—Jianq Chyun IP Office

(57) ABSTRACT

The present invention provides a method for updating GPS ephemeris data, which is applicable to a navigation device containing a GPS ephemeris data. The method for updating GPS ephemeris data includes the following steps: first, the navigation device counting down a predetermined time; next, searching a GPS ephemeris data server through a network interface; then performing a download from the GPS ephemeris data server so as to update the GPS ephemeris data in the navigation device. Accordingly, the time required for updating ephemeris data is shortened.

12 Claims, 2 Drawing Sheets

METHOD FOR UPDATING EPHEMERIS DATA OF GLOBAL POSITIONING SYSTEM

CROSS-REFERENCE TO RELATED APPLICATION

This application claims the priority benefit of Taiwan application serial no. 94132256, filed on Sep. 19, 2005. All disclosure of the Taiwan application is incorporated herein by reference.

BACKGROUND OF THE INVENTION

1. Field of Invention

The present invention relates to a method for updating ephemeris data of global positioning system (GPS). More particularly, the present invention relates to a method for updating GPS ephemeris data, which may be automatically downloaded from a GPS ephemeris data server.

2. Description of Related Art

Global Positioning System (hereafter denoted as GPS), a precise satellite navigation positioning technology, has been developed by the United States of America. In the global satellite positioning system, there are 26 satellites distributed on six orbits which are inclined at fifty-five degrees with respect to the equatorial plane, so that the users of the global satellite positioning system, no matter when or where on the earth, as long as no shielding of terrains or buildings, can receive the signals from 4 to 8 satellites so as to be positioned by the satellites without the influence of weather. Taking advantage of the advanced technology, anyone can easily get the correct position, velocity and time from his/her GPS navigation device.

Funded by the U.S. Department of Defense and participated by the US Department of Transportation, GPS development plan has been transferred for civil uses, such as the relative operations of navigation positioning, precise measuring, attitude controlling and standard timing. As a navigation system combining the technologies of satellite and radio, GPS can provide user's precise position, velocity and time. The application of GPS has been extensively existed in the current market and, along with the progress of the satellite technology, a great deal of new GPS technologies are being rapidly developed as well as business opportunities. In the early stages, GPS was limited to military sector for military uses, such as precise positioning of warplanes, warships, vehicles, personnel and attack targets. Nowadays, GPS has been opened to civil positioning use. The business of this high tech combining the technologies of satellite and radio are thriving in the extensively civil market such as providing exact information about velocity, time, direction and distance as well as precise positioning. GPS is indeed full of unlimited business opportunities.

However, in the present GPS positioning, for receiving satellite signals and downloading GPS ephemeris data from GPS satellites through the GPS antenna, the navigation device has to be located at an open area such as sky and no shielding around. Only when GPS ephemeris data has been downloaded, the needed ephemeris data is enough to perform the first positioning process. The process above is called 'cold start'. Such a process takes from 45 seconds to 2 minutes. If the user is in an area where GPS signals are not received well, a longer time will be taken.

Still and all, those downloaded GPS ephemeris data is in timeliness. The locations of GPS satellites in the space are not fixed as the GPS satellite revolves around the earth two times a day. For example, with the SiRF GPS module, all the GPS ephemeris data is effective in four hours. The original GPS ephemeris data will be no value for positioning after four hours, if no update action is done during this time. Therefore, it is necessary to perform the cold start process once more. In this way, it takes a lot of time to update GPS ephemeris data periodically.

In view of this, Global System for Mobile Communications(GSM) integrated with the General Packet Radio Service (GPRS), applied in the cell phones have been developed for positioning in recent years, which generally be called as AGPS(assist). The biggest difference between the traditional GPS and AGPS is that GPS only uses satellites to do positioning and takes a long time for the first and latter positioning while AGPS roughly searches the user's position through the GSM base station first, then do precise positioning through GPS satellites. Furthermore, AGPS not only saves time from the traditional one minute to 10 seconds for the first positioning and from 40 seconds to 0.1 second for each latter positioning, but also overcomes the weakness that the traditional GPS can not do positioning in the house due to the bad satellite signals therein.

AGPS can overcome the weakness that the traditional GPS positioning takes long time to update GPS ephemeris data, however, the cell phone with AGPS functions is indispensable first for the user. Then, the telecommunication operator must provide further service. Besides, the telecommunication operator will charge for the transmission of AGPS packages, so that it is not cost-efficient.

SUMMARY OF THE INVENTION

Accordingly, the present invention is directed to provide a method for updating ephemeris data of global positioning system (GPS), which can automatically download and update the GPS ephemeris data from the GPS ephemeris data server after the GPS ephemeris data in the navigation device becomes invalid so as to reduce the time to update the GPS ephemeris data.

The present invention provides a method for updating GPS ephemeris data, which is applicable to a navigation device containing a GPS ephemeris data. The method for updating GPS ephemeris data includes the following steps: first, counting down a predetermined time; next, searching a GPS ephemeris data server through a network interface; then performing a download from the GPS ephemeris data server so as to update the GPS ephemeris data in the navigation device.

According to a preferred embodiment of the present invention, the GPS ephemeris data server stores the latest GPS ephemeris data.

According to a preferred embodiment of the present invention, the navigation device repeats searching global positioning satellites in accordance with the last updated GPS ephemeris data.

According to a preferred embodiment of the present invention, the predetermined time is the valid time of the GPS ephemeris data in the navigation device.

According to a preferred embodiment of the present invention, the navigation device searches the GPS ephemeris data server every intervals of time.

According to a preferred embodiment of the present invention, the navigation device further includes a microprocessor which is for counting down the predetermined time.

According to a preferred embodiment of the present invention, the network interface is a wireless network interface.

According to a preferred embodiment of the present invention, the network interface is a Bluetooth network interface.

According to a preferred embodiment of the present invention, the navigation device performs the download in a wireless network mode.

According to a preferred embodiment of the present invention, the navigation device performs the download in a Bluetooth network mode.

According to a preferred embodiment of the present invention, a power supply of the navigation device can be under an off state. When the power supply of the navigation device is off, this method for updating GPS ephemeris data performs the download on the background of the navigation device system.

In the present invention, the GPS ephemeris data is downloaded from a GPS ephemeris data server, therefore, the GPS ephemeris data can be automatically downloaded from the GPS ephemeris data server once the time of the GPS ephemeris data becomes invalid. In addition, the navigation device can repeat searching the global positioning satellites through the updated GPS ephemeris data so that the time in which the navigation device receives data can be reduced as well as the time taken by cold start.

In order to make the aforementioned and other objects, features and advantages of the present invention comprehensible, a preferred embodiment accompanied with figures is described in detail below.

DESCRIPTION OF EMBODIMENTS

The most important characteristic of the method for updating GPS ephemeris data according to the present invention resides in where the GPS ephemeris data can be automatically downloaded and updated from the GPS ephemeris data server once the time of the GPS ephemeris data becomes invalid. Thus, the navigation device can search the global positioning satellites repeatedly through this updated GPS ephemeris data so as to reduce the time required for updating GPS ephemeris data.

Figure 1:
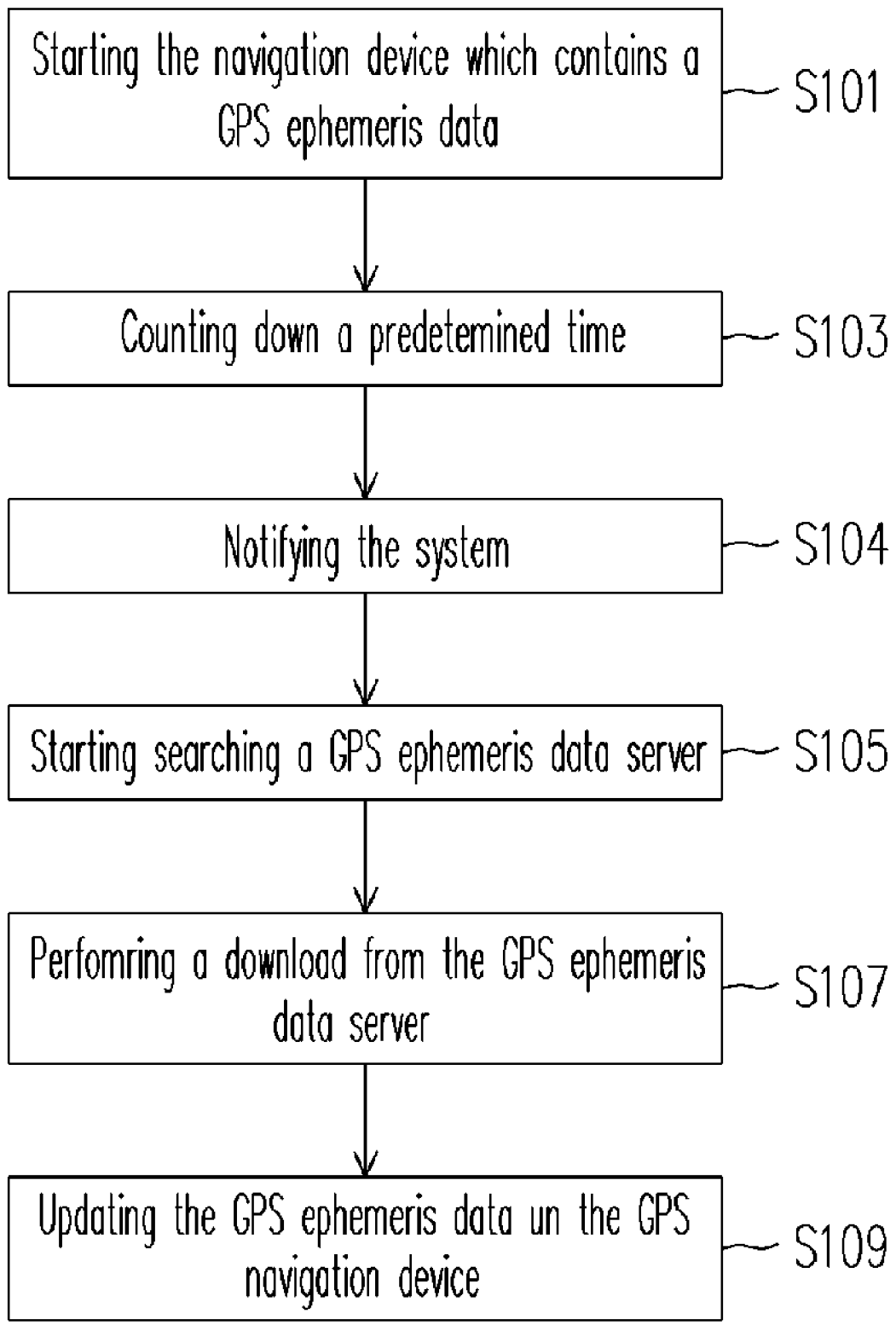
FIG. 1 is the flow chart of a method for updating GPS ephemeris data according to the present invention.

FIG. 1 is the flow chart of a method for updating GPS ephemeris data according to the present invention. Those people skilled in the art will understand that the navigation device can be integrated in a smart phone, a PDA or a mobile phone; nevertheless, the present invention is not limited to these.

First, in step S101, the navigation device has been started and the latest updated GPS ephemeris data is stored therein. For example, in the preferred embodiment of the present invention, the navigation device may have finished a series of initializations such as cold start.

Here, if the navigation device loses signals of the GPS satellites, it starts to count down a predetermined time in step S103. The aforementioned predetermined time can be a valid time of the GPS ephemeris data. For example, as mentioned above, the valid time of the GPS ephemeris data of SiRF GPS module is four hours. Therefore, in the present embodiment, the predetermined time can be set as four hours.

If the predetermined time is over and no GPS satellite signal is received, the GPS ephemeris data in the navigation device becomes invalid. Then, the present invention performs step S104 to notify the system (namely a central processing unit of the navigation device) with this message.

In step S105, through the built-in network interface the navigation device starts to search for a GPS ephemeris data server so as to prepare for updating GPS ephemeris data.

In step S107, after the navigation device finds a GPS ephemeris data server, it performs a download from the GPS ephemeris data server, that is, downloads the latest ephemeris data from the GPS ephemeris data server so as to update the GPS ephemeris data in the GPS navigation device as shown in step S109.

Figure 2:
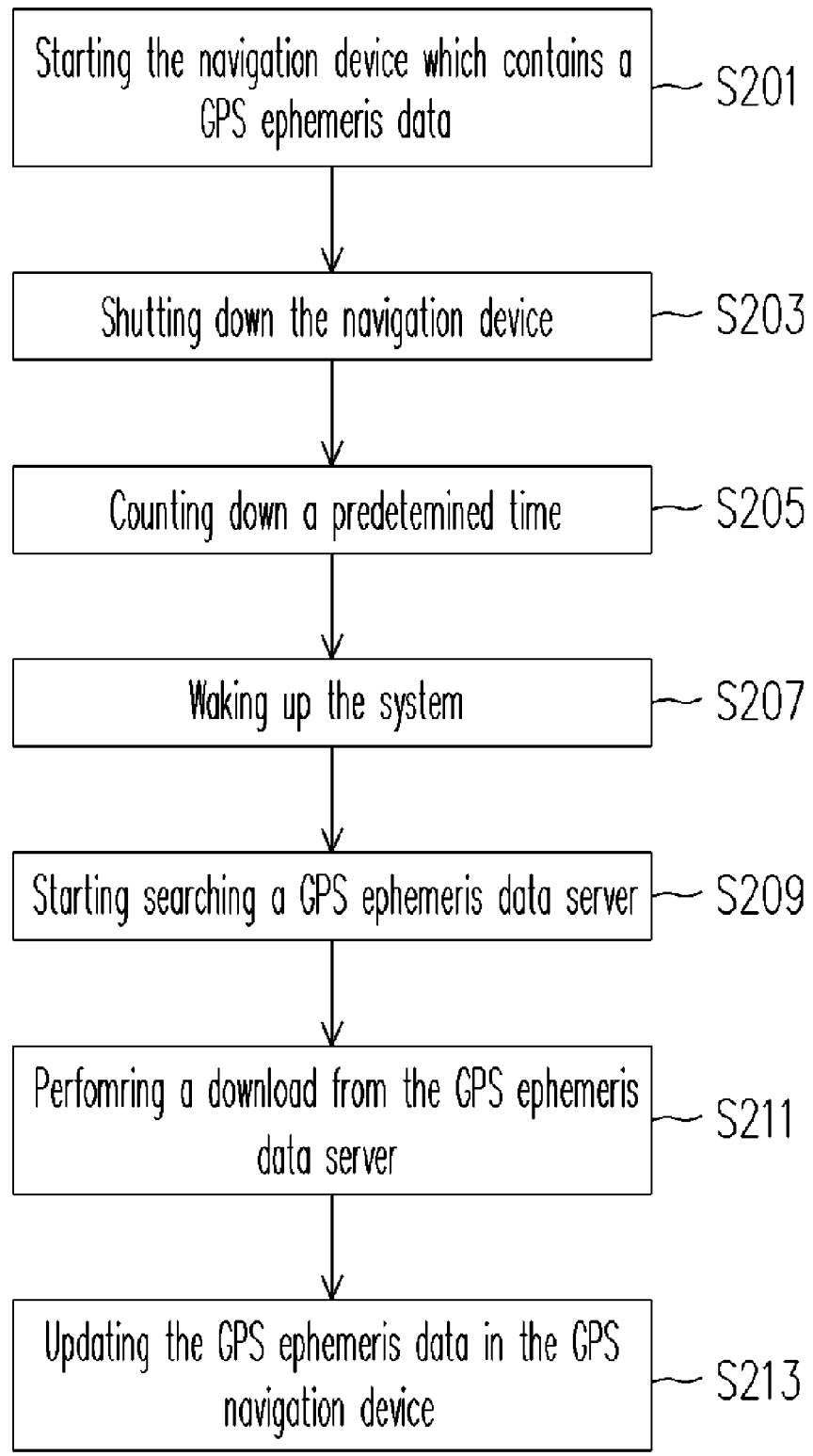
FIG. 2 is the flow chart of another method for updating GPS ephemeris data according to the present invention.

FIG. 2 is the flow chart of another method for updating GPS ephemeris data according to the present invention. Referring to FIG. 2, the present invention provides another embodiment.

Similarly, as shown in step S101 of FIG. 1, in step S201, the navigation device has been started and the latest updated GPS ephemeris data is stored therein.

Next, in step S203, it is assumed that the user shuts down the navigation device. Here, in step S205, the navigation device starts to count down a predetermined time.

In the preferred embodiment, besides the central processing unit, the navigation device includes another microprocessor used to perform the navigating action in step S205 independently. Thus, the navigation device does not need to use the central processing unit to count down.

After finishing counting down the predetermined time, in step S207, the microprocessor wakes up the system; then in step S209, the system starts to search for GPS ephemeris data servers. Because the navigation device is under an off state, all the actions can be performed under the background. Namely, the navigation device performs the actions with the least necessary hardware without activating other unnecessary functions.

When the navigation device finds a GPS server, step S211 performs a download from the found GPS server, like step S107 illustrated in FIG. 1.

Then, in step S213, the navigation device updates its GPS ephemeris data with the latest GPS ephemeris data downloaded from the GPS ephemeris data server.

In the present embodiment, the GPS ephemeris data server automatically receives the latest GPS ephemeris data by means of the global positioning system receiver and stores the latest GPS ephemeris data into its built-in storage device for the navigation device to do updating at any time. The aforementioned GPS ephemeris data at least includes information about the orbit position, groups and so on of each satellite, which can speed up the search of satellites for the GPS receiver.

For those people skilled in this art, it is clear that the GPS ephemeris data server can be built, for example, by the user of the navigation device or by the business service providers; however, the present invention should not be limited to.

In addition, when the navigation device is searching a GPS ephemeris data server, the navigation device works every intervals of time instead of a continuous search. That is, if the navigation device finishes an action searching a GPS ephemeris data server without success, it will do the action again after an interval of time. Further, the built-in network interface of the navigation device can be a wireless network interface or a Bluetooth network interface. When the navigation device finds a GPS ephemeris data server around through the built-in network, it will prepare for downloading data from the GPS ephemeris data server so as to update the current GPS ephemeris data.

As illustrated above, for downloading and updating GPS ephemeris data, the navigation device can directly connect to a GPS ephemeris data server through the built-in network, then download the latest GPS ephemeris data from the GPS ephemeris data server.

On the other hand, the GPS ephemeris data server can also be built by a business service provider. The service provider may be someone who builds such GPS ephemeris data servers in several areas. As connecting through the network, the user can be connected to the nearest GPS ephemeris data server so that the user is assured to obtain the correct GPS ephemeris data.

In the preferred embodiment of the present invention, the method in which the navigation device updates the GPS ephemeris data is the same way with the searching method above, the updating method can be used through the wireless network interface or the Bluetooth network interface. However, the present invention is not limited to.

In addition to the updating method described above, the navigation device can also use a network system connected by a host computer to search a GPS ephemeris data server for updating the GPS ephemeris data. The user can use one of the communication protocols between the navigation device and the host computer to download GPS ephemeris data from the host computer. The communication protocols can be, for example, the wireless transmission mode or the wire transmission mode. The wireless transmission mode can be, for example, infrared transmission, radio transmission or Bluetooth transmission.

Furthermore, the updating process performed by the host computer can be either synchronization action or asynchrony action. The synchronization action means that after the navigation device has been connected to the host computer, the host computer is connected to the GPS ephemeris data server; once the host computer receives the latest GPS ephemeris data, the navigation device downloads the GPS ephemeris data from the host computer right away. Contrarily, the asynchrony action denotes that after the host computer downloads the GPS ephemeris data from the GPS ephemeris data server and stores it, the navigation device is connected to the host computer and then downloads the GPS ephemeris data from the host computer.

Last, in step S107, after the navigation device has updated the GPS ephemeris data, the navigation device searches four global positioning satellites needed for performing positioning by using the updated GPS ephemeris data. When the navigation device finds the four global positioning satellites, it can receive the satellite positioning signals from the global positioning satellites. Then, the navigation device decodes the satellite positioning signals to obtain the positioning data of the position where the navigation device is located. The position of the navigation device can further be displayed on the GIS (Geographic Information System) map according to the positioning data (such as longitude, latitude, relative displacement velocity and angle and so on).

In summary, the method for updating GPS ephemeris data according to the present invention can automatically download the GPS ephemeris data from the GPS ephemeris data server once the GPS ephemeris data becomes invalid. The navigation device can search the global positioning satellites repeatedly through the updated GPS ephemeris data. The GPS ephemeris data is downloaded and updated from the GPS ephemeris data server by means of the general network connection. Nowadays, network is so developed that network connection can be obtained very easily, so that GPS ephemeris data can be downloaded at any place where network can be connected, and the download speed is much faster than the traditional mode. Furthermore, because the navigation device updates the GPS ephemeris data stored in the GPS ephemeris data server, even if the user is in the area where the GPS signals are not received well, the time to receive the GPS ephemeris data can also be reduced.

The present invention is disclosed above with its preferred embodiments. It is to be understood that the preferred embodiment of present invention is not to be taken in a limiting sense. It will be apparent to those people skilled in the art that various modifications and variations can be made to the structure of the present invention without departing from the scope or spirit of the invention. The protection scope of the present invention is in accordant with the scope of the following claims and their equivalents.

What is claimed is:

1. A method for updating ephemeris data of global positioning system, being applicable to a navigation device containing a GPS ephemeris data, comprising:
    counting down a predetermined time once the navigation device loses signals of GPS satellites;
    searching a GPS ephemeris data server through a network interface;
    performing a download from the GPS ephemeris data server; and
    updating the GPS ephemeris data in the navigation device under a background of the navigation device.

2. The method for updating GPS ephemeris data as claimed in claim 1, wherein the GPS ephemeris data server stores the latest GPS ephemeris data.

3. The method for updating GPS ephemeris data as claimed in claim 1, wherein the navigation device searches the global positioning satellites through updated GPS ephemeris data.

4. The method for updating GPS ephemeris data as claimed in claim 1, wherein the predetermined time is a valid time of the GPS ephemeris data in the navigation device.

5. The method for updating GPS ephemeris data as claimed in claim 1, wherein the navigation device searches the GPS ephemeris data server every intervals of time.

6. The method for updating GPS ephemeris data as claimed in claim 1, wherein the navigation device further comprises a microprocessor for counting down the predetermined time.

7. The method for updating GPS ephemeris data as claimed in claim 1, wherein the network interface is a wireless network interface.

8. The method for updating GPS ephemeris data as claimed in claim 1, wherein the network interface is a Bluetooth network interface.

9. The method for updating GPS ephemeris data as claimed in claim 1, wherein, the navigation device performs the download in a wireless network mode.

10. The method for updating GPS ephemeris data as claimed in claim 1, wherein the navigation device performs the download in a Bluetooth network mode.

11. The method for updating GPS ephemeris data as claimed in claim 1, wherein a power supply of the navigation device is under an off state.

12. The method for updating GPS ephemeris data as claimed in claim 1, wherein the navigation device has a central processing unit and a microprocessor, and the microprocessor is used for counting down the predetermined time.

* * * * *